United States Patent
Lazo (10) Patent No.: US 8,548,971 B2
(45) Date of Patent: Oct. 1, 2013

(54) FINANCIAL TRANSACTION RECONCILIATION

(75) Inventor: Benjamin J Lazo, Carrollton, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/370,771

(22) Filed: Feb. 10, 2012

(65) Prior Publication Data

US 2013/0211978 A1   Aug. 15, 2013

(51) Int. Cl.
    *G06F 17/30* (2006.01)
(52) U.S. Cl.
    USPC .............................................. 707/706; 705/30
(58) Field of Classification Search
    USPC ................. 235/375, 376, 380, 383; 705/30, 705/34, 35, 38, 400; 707/705, 706
    See application file for complete search history.

(56) References Cited

U.S. PATENT DOCUMENTS

| | | | |
|---|---|---|---|
| 8,055,643 B2 * | 11/2011 | Kenedy et al. ............... | 707/706 |
| 8,122,339 B2 * | 2/2012 | Bastos dos Santos et al. ............................. | 715/227 |
| 8,185,461 B2 * | 5/2012 | Kenedy et al. .................. | 705/35 |
| 8,261,180 B2 * | 9/2012 | Bastos dos Santos et al. ............................. | 715/227 |
| 8,290,880 B2 * | 10/2012 | Shan et al. .................... | 705/400 |

* cited by examiner

*Primary Examiner* — Andrew Joseph Rudy
(74) *Attorney, Agent, or Firm* — Banner & Witcoff, Ltd.; Michael A. Springs (57) ABSTRACT

Methods, computer-readable media, and apparatuses are disclosed for reconciling sets of financial transactions. A reconciliation input set of positive and negative numbers may be received, and a positive subset size and negative subset size may be determined for one or more reconciliation attempts. Maximum and minimum subset sums for the positive and negative subset sizes may be determined, and certain overlapping and non-overlapping portions may be identified between the positive subset sum range and the negative subset sum range. For any overlapping portions, a plurality of subset sum comparisons may be performed between positive subsets of the determined positive subset size and negative subsets of the determined negative subset size.

20 Claims, 6 Drawing Sheets

Positive Set ← 300a

| 1 | 2 | 3 | ... | A |
|---|---|---|-----|---|
| +1.23 | +5.51 | +8.47 | ... | +1,030.29 |

Negative Set ← 300b

| 1 | 2 | 3 | ... | B |
|---|---|---|-----|---|
| -0.44 | -0.87 | -2.30 | ... | -943.03 |

FIG. 4

Positive Subset Size X ← 400a

| X | X+1 | X+2 | ... | A |
|---|-----|-----|-----|---|
| Max X (1 to X) | Max X (1 to X+1) | Max X (1 to X+2) | ... | Max X (1 to A) |

$X_{min}$ ↑ ... ↑ $X_{max}$

Negative Subset Size Y ← 400b

| Y | Y+1 | Y+2 | ... | B |
|---|-----|-----|-----|---|
| Max Y (1 to Y) | Max Y (1 to Y+1) | Max Y (1 to Y+2) | ... | Max Y (1 to B) |

$Y_{min}$ ↑ ... ↑ $Y_{max}$

Positive Set A:
2-Item Look-Ahead Table

| Item Nos. | Sum |
|---|---|
| 1, 2 | +6.74 |
| 1, 3 | +9.70 |
| 1, 4 | ... |
| ... | ... |
| 1, A | +1,031.52 |
| 2, 3 | +13.98 |
| 2, 4 | ... |
| ... | ... |
| 2, A | +1,035.80 |
| 3, 4 | ... |
| 3, 5 | ... |
| ... | ... |
| 3, A | +1,038.76 |
| 4, 5 | ... |
| ... | ... |
| A-1, A | ... |

Sample Positive Numbers (A = 6)

| 10 | 15 | 25 | 30 | 40 | 45 |
|----|----|----|----|----|----|

Bit Shifting Sequence (X = 3) — Sums

| b1 | b2 | b3 | b4 | b5 | b6 | Sum | |
|---|---|---|---|---|---|---|---|
| 0 | 0 | 0 | 1 | 1 | 1 | 115 | ← $X_{max}$ Max X (1 to A) |
| 0 | 0 | 1 | 0 | 1 | 1 | 110 | |
| 0 | 1 | 0 | 0 | 1 | 1 | 100 | |
| 1 | 0 | 0 | 0 | 1 | 1 | 95 | |
| 0 | 0 | 1 | 1 | 0 | 1 | 100 | |
| 0 | 1 | 0 | 1 | 0 | 1 | 90 | |
| 1 | 0 | 0 | 1 | 0 | 1 | 85 | |
| 0 | 1 | 1 | 0 | 0 | 1 | 85 | |
| 1 | 0 | 1 | 0 | 0 | 1 | 80 | |
| 1 | 1 | 0 | 0 | 0 | 1 | 70 | |
| 0 | 0 | 1 | 1 | 1 | 0 | 95 | ← Local Max, Max X (1 to A-1) |
| 0 | 1 | 0 | 1 | 1 | 0 | 85 | |
| 1 | 0 | 0 | 1 | 1 | 0 | 80 | |
| 0 | 1 | 1 | 0 | 1 | 0 | 80 | |
| 1 | 0 | 1 | 0 | 1 | 0 | 75 | |
| 1 | 1 | 0 | 0 | 1 | 0 | 65 | |
| 0 | 1 | 1 | 1 | 0 | 0 | 70 | ← Local Max, Max X (1 to A-2) |
| 1 | 0 | 1 | 1 | 0 | 0 | 65 | |
| 1 | 1 | 0 | 1 | 0 | 0 | 55 | |
| 1 | 1 | 1 | 0 | 0 | 0 | 50 | ← $X_{min}$ Max X (1 to X) |

FIG. 7

FINANCIAL TRANSACTION RECONCILIATION

TECHNICAL FIELD

One or more aspects of the disclosure generally relate to computing devices, computing systems, and computer software. In particular, one or more aspects of the disclosure generally relate to computing devices, computing systems, and computer software that may be used by an organization, business, or other entity to reconcile a set of financial transactions.

BACKGROUND

In many business relationships or financial transaction systems, parties may engage in a series of separate financial transactions which are related sub-parts of a single transaction. For example, a first department within a business may extend a series of credit payments to a second department, and may receive a series of debit payments in return. In certain cases, it may be desirable to reconcile some or all of the credit and debit payments into a single zero-sum transaction. For example, if the first department credits the second department with payments of $3, $5, and $10, and then receives two debit payments from the second department of $7 and $11, then these five transactions can be reconciled into a single zero balance transaction. In such cases, there may be a requirement that a reconciliation solution must be exact for any of the payments to be reconciled. Therefore, if the two payments received from the second department are in the amounts of $7 and $12, then none of the five payments can be reconciled.

Although this example illustrates a simple reconciliation process, many real-world financial transaction reconciliation problems are significantly more complex. For example, attempts to reconcile large numbers of credit and debit transactions, and reconciliation problems in which the reconciliation solution might not include all of the transactions, can take up significant human analyst time and/or large amounts of computing resources. For example, an attempt to reconcile several hundred credit and debit financial transactions, when some of the transactions may not part of the reconciliation solution, may be a computational problem taking days or weeks of computing time and/or very large amounts of computer memory.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for reconciling sets of financial transactions. In certain embodiments, a reconciliation input set of positive and negative numbers may be received at a computing device. A positive subset size and a negative subset size may be determined for a first reconciliation attempt. In the first reconciliation attempt, a positive subset sum range and a negative subset sum range are determined by calculating the maximum and minimum subset sums for the positive and negative subset sizes. Additionally, in some embodiments, one or more local maxima or local minima may be calculated using a predetermined bit shifting sequence. Using the determined maximum and minimum subset sums and/or the calculated local maxima and local minima, certain overlapping and non-overlapping portions may be identified between the positive subset sum range and the negative subset sum range. For any overlapping portions between the positive subset sum range and the negative subset sum range, a plurality of subset sum comparisons may be performed between positive subsets of the determined positive subset size and negative subsets of the determined negative subset size. For any non-overlapping portions between the positive subset sum range and the negative subset sum range, corresponding subset sum comparisons need not be performed.

In additional aspects of the disclosure, a reconciliation solution may be identified including a first subset of X positive numbers and a second subset of Y negative numbers. For example, if a positive subset sum and negative subset sum having equal sum values are identified, the positive and negative subsets may be returned as a reconciliation solution and the first reconciliation attempt may be stopped. In other examples, a positive or negative look-ahead table may be used to reconcile a difference between the positive and negative subset sums. According to additional aspects of the disclosure, a processing loop and/or one or more worker threads may be used to perform different reconciliation attempts corresponding to different positive and negative subset sizes.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1:
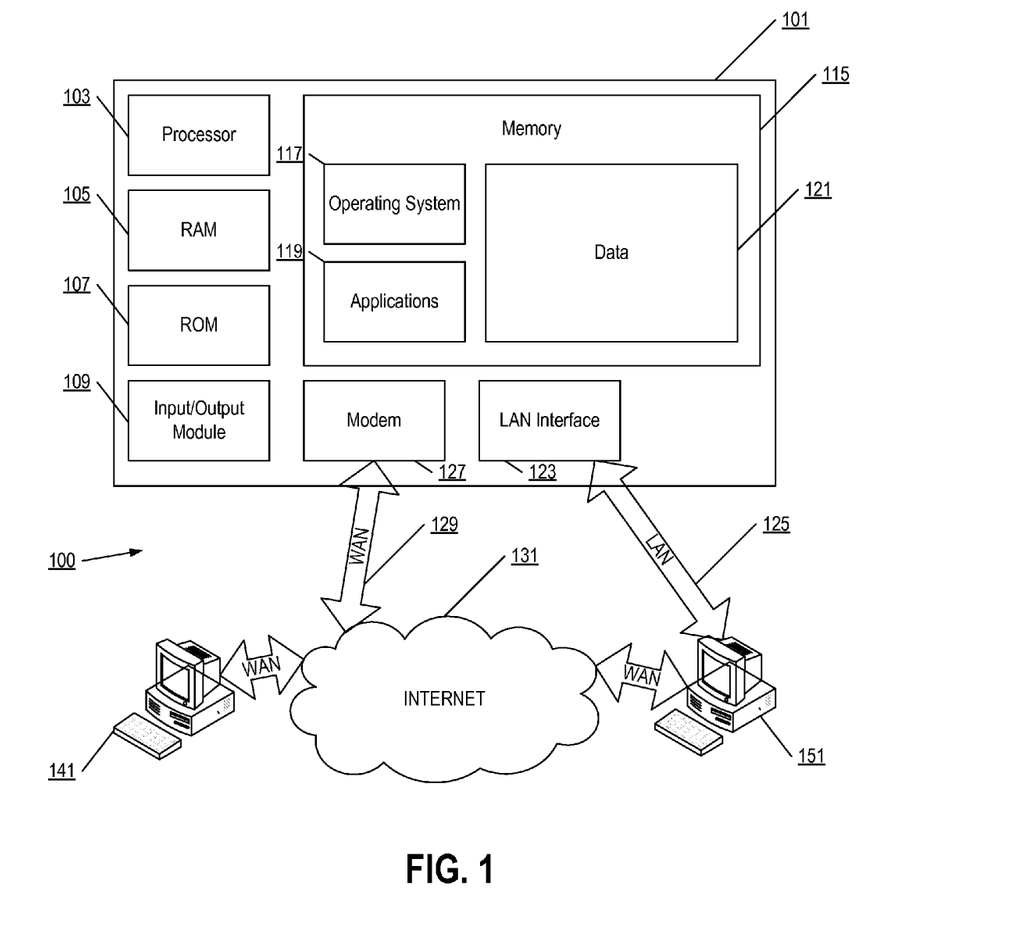
FIG. 1 illustrates an example computing environment in which various aspects of the disclosure may be implemented.

FIG. 1 illustrates an example block diagram of a generic computing device 101 (e.g., a computer server) in an example computing environment 100 that may be used in one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mobile device, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Generic computing device 101 and/or terminals 141 or 151 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Having described a general computing environment in FIG. 1 on which various financial transaction reconciliation embodiments may be performed, the following paragraphs describe financial transaction reconciliation embodiments and examples in accordance with the disclosure in greater detail.

Figure 2:
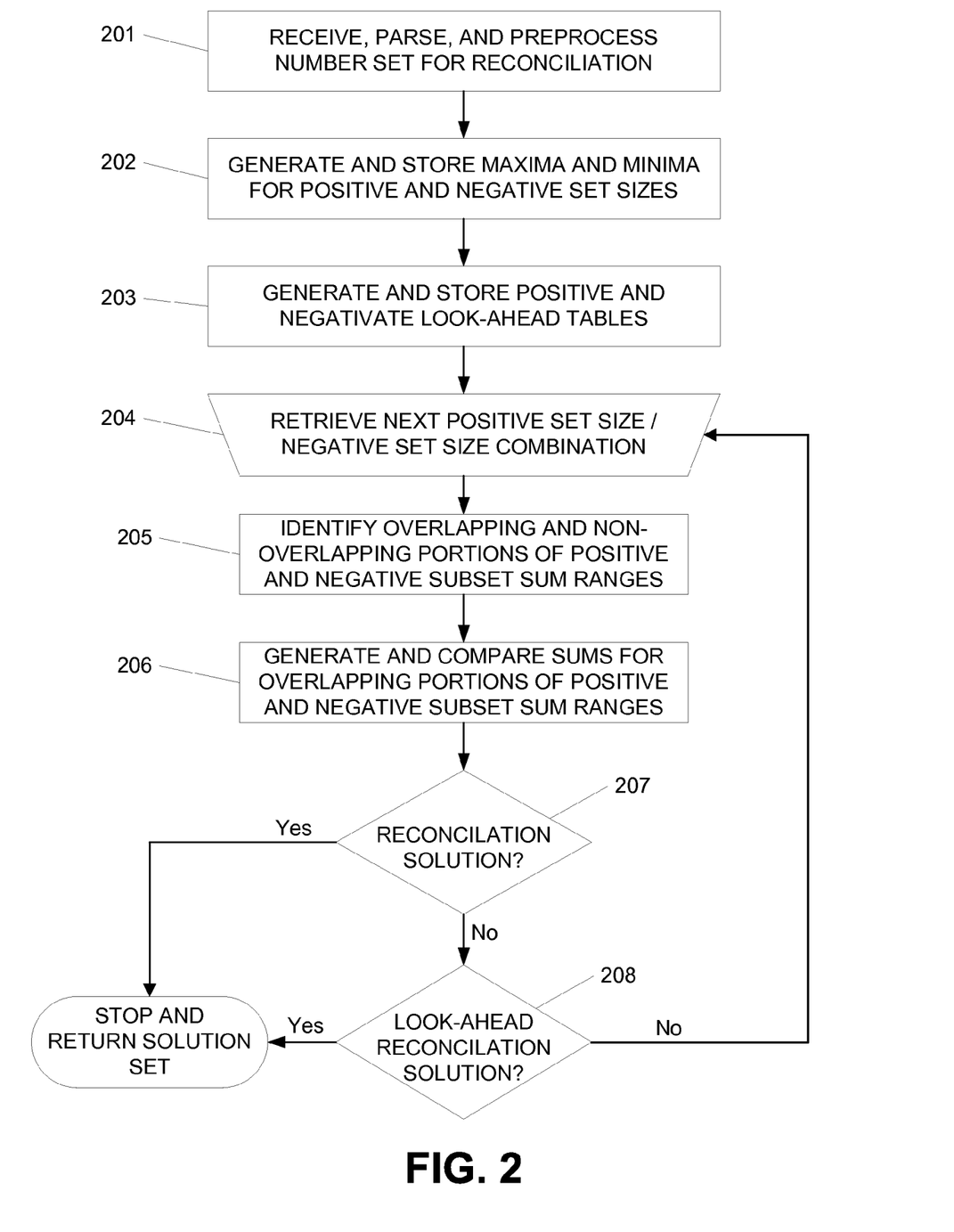
FIG. 2 is a flow diagram illustrating an example process of reconciling a set of financial transactions in accordance with one or more illustrative aspects described herein.

Referring now to FIG. 2, a flow diagram is shown illustrating an example process for reconciling a set of financial transactions. In step 201, a set of financial transactions data is received at a computing device 101, for example, from one or more remote terminals 141 or 151 or via an input module 109. Any number of financial transactions greater than one may be reconciled, and thus the set of data received may include two or more positive or negative numbers.

The financial transaction data may be received by the computing device 101 in any of several different data formats. Therefore, in step 201, the computing device 101 may parse and preprocess the financial transaction data into a format recognizable to the reconciliation functions and processes performed in steps 202-208. For example, financial transaction data expressed as a mixed set of credit and debit transactions may be converted into positive and negative numbers. Additionally, in certain computing environments, specific numeric data types (e.g., integers, fixed-point decimals) may be processed more quickly than other data types (e.g., floating point decimals, currencies, strings). Therefore, the received financial transaction data may be converted in step 201 into a preferred data type based on the characteristics of the computing device 101.

Figure 3:
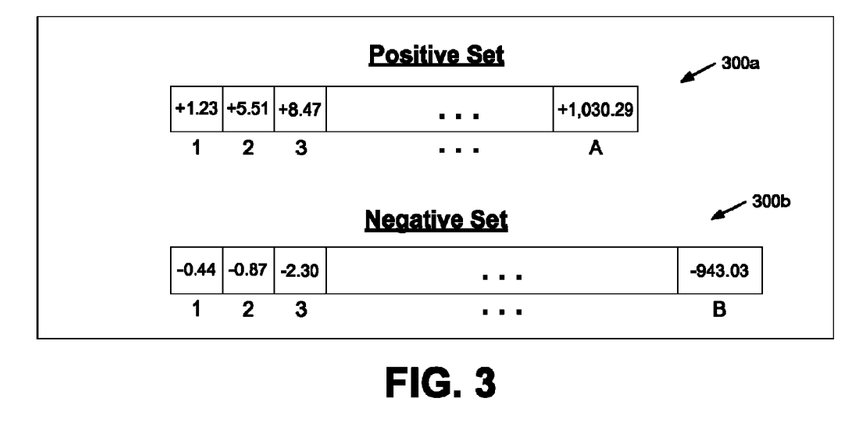
FIG. 3 illustrates two example sets of positive and negative numbers corresponding to a set of financial transactions in accordance with one or more illustrative aspects described herein.

The financial transaction data in step 201 may also be parsed into positive or negative sets (e.g., corresponding to credits and debits, loans and remittances, payments and receipts, etc.), and stored in separate data structures (e.g., tables, lists, arrays, etc.) of positive and negative numbers. The negative and positive numbers may also be sorted (e.g., smallest to largest) in preparation for the reconciliation functions and processes performed in steps 202-208. For example, FIG. 3 illustrates two arrays storing an example set of parsed and preprocessed financial transaction data. The positive array 300a includes a sorted list of A positive numbers (e.g., credits), and the negative array 300b includes a sorted list of B negative numbers (e.g., debits). Additionally, as shown in this example, the number of positive numbers need not be the same as the number of negative numbers.

In step 202, using the positive and negative arrays generated in step 201, one or more sets of maxima and/or minima subset sum values is generated and stored for one or more positive and negative subset sizes. For example, if the total reconciliation input set includes A positive numbers, a series of maximum subset sums may be calculated for each possible positive subset size [1 to A]. In this example, the largest possible positive subset size is A, that is, the complete set of positive numbers. When the positive subset size is A, there is only one possible subset sum value to calculate in step 202, and the maximum (and minimum) subset sum is the sum of all of the positive numbers A in the reconciliation input set. Similarly, if the reconciliation input set includes B negative numbers, then the maximum (and minimum) subset sum value is equal to the sum of all of the negative numbers B in the reconciliation input set.

However, as mentioned above, a reconciliation solution might not use every positive number in the positive input set A, or every negative number in the negative input set B. Therefore, a series of maxima and/or minima for other positive and negative subset sizes may be calculated as well. For example, for a positive subset size of A-1, two different maxima may be calculated in step 202. The first maximum is the maximum subset sum of A-1 numbers, out of the complete set of positive numbers A. To calculate the first maximum, the smallest number in the positive number array 300a may be dropped and the remaining numbers may be summed. The second maximum for a positive subset size of A-1 is the maximum subset sum out of the numbers 1 through A-1 in the positive set A. To calculate the second maximum, the largest number in the positive number array 300a may be dropped and the remaining numbers may be summed. In this example, the first maximum may be referred as Max [1 to A], and the second maximum may be referred as Max [1 to A-1]. However, because there is only one possible subset of size A-1 using the numbers 1 through A-1, Max [1 to A-1] also the minimum possible subset of size A-1 in the positive set A.

Continuing this example, for a positive subset size of A-2, three different maxima may be calculated in step 202. First, Max [1 to A], which can be calculated by dropping the smallest two numbers from the positive array 300a. Second, Max [1 to A-1], which can be calculated by dropping the largest number and the smallest number from the positive array 300a. Third, Max [1 to A-2], which can be calculated by dropping the largest two numbers from the positive array 300a. Max [1 to A-2] is also the minimum possible subset of size A-2 in the positive set A. For a positive subset size of A-3, four different maxima may be calculated in step 202: Max [1 to A], Max [1 to A-1], Max [1 to A-2], and Max [1 to A-3], and so on for positive subset sizes of A-4, A-5, . . . , down to 1. Similar sets of calculations may be performed for the negative number set B in the negative array 300b. That is, for a negative subset size of B, one maximum is calculated in step 202, Max [1 to B]. For a negative subset size of B-1, two maxima are calculated: Max [1 to B] and Max [1 to B-1], and so on. The number of maxima calculated and stored in step 202 may be equal to the input set size (e.g., positive set size A or negative set size B), minus the subset size, plus one.

Figure 4:
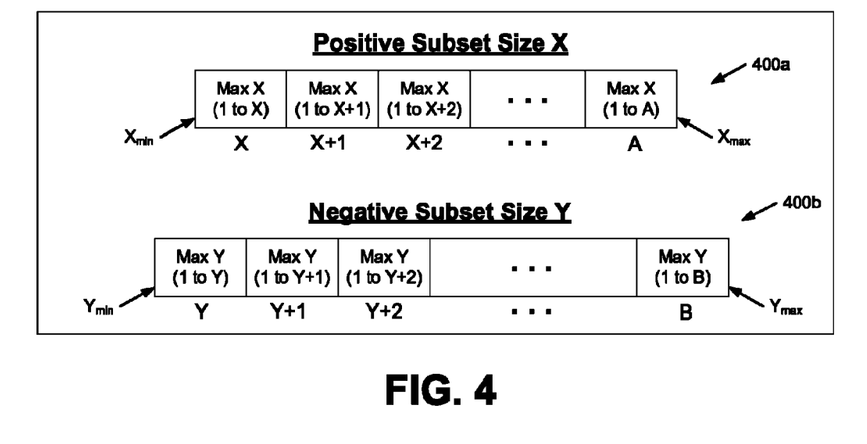
FIG. 4 illustrates two example sets of positive and negative maximum subset sums in accordance with one or more illustrative aspects described herein.

Two example sets of maxima subset sums generated in step 202 are shown in FIG. 4. In this example, the first array 400a contains a set of maximum subset sums for a positive subset size X, and the second array 400b contains a set of maximum subset sums for a negative subset size Y. Although FIG. 4 includes just two arrays, corresponding arrays may be generated for some or all of the remaining positive subset sizes (i.e., for every X between 1 to A), and for some or all of the remaining negative subset sizes (i.e., for every Y between 1 to B).

Figure 7:
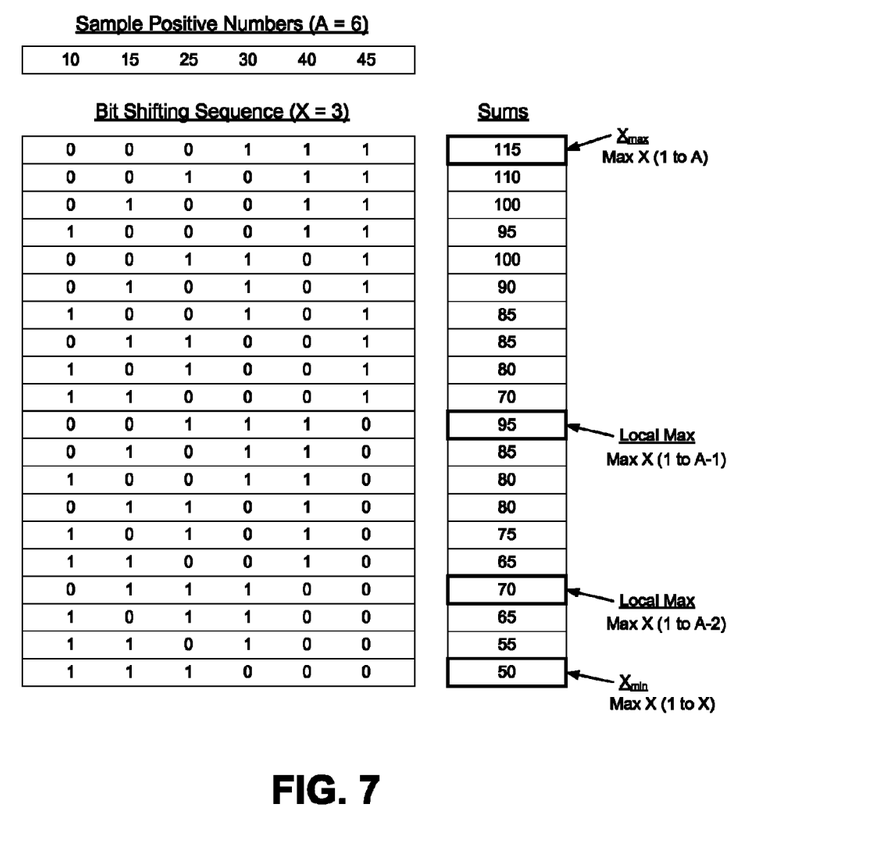
FIG. 7 illustrates an example of a series of subset summing operations in accordance with one or more illustrative aspects described herein.

Another example containing sample data and showing a set of maxima subset sums is shown in FIG. 7, described in more detail below. In this example, the data are provided for a positive set size A=6, wherein the positive subset size X=3. The maximum subset sum values are calculated and highlighted at the right FIG. 7. In this example, because A=6 and X=3, four maxima are calculated (determined by A-X+1). First, Max X [1 to A], which is also the overall maximum ($X_{max}$) for all X-sized subsets within the positive number set A. Second, Max X [1 to A-1], which may also be referred to as Max X [1 to X+2]. Third, Max X [1 to A-2], which may also be referred to as Max X [1 to X+1]. Fourth, Max X [1 to X], which is also the overall minimum ($X_{min}$) for all X-sized subsets within the positive number set A. As illustrated in this example, the smallest and largest maxima subset sums correspond respectively to the smallest possible sum $X_{min}$ and largest possible sum $X_{max}$ for a subset of size X within a reconciliation input set of A positive numbers (and similarly $Y_{min}$ and $Y_{max}$ are the smallest possible sum and largest possible sum for subset of size Y within a negative reconciliation input set B). The other maxima calculated in step 202 may be referred to as "local maxima," in that they are not overall $X_{max}$ or $X_{min}$ values. As described in more detail below, the overall maximum/minimum values, along with the other local maxima/minima for positive and negative subset sizes, may subsequently be used to determine non-overlapping occurrences between positive and negative subset sum ranges for which reconciliation comparisons need not be performed.

Figure 5:
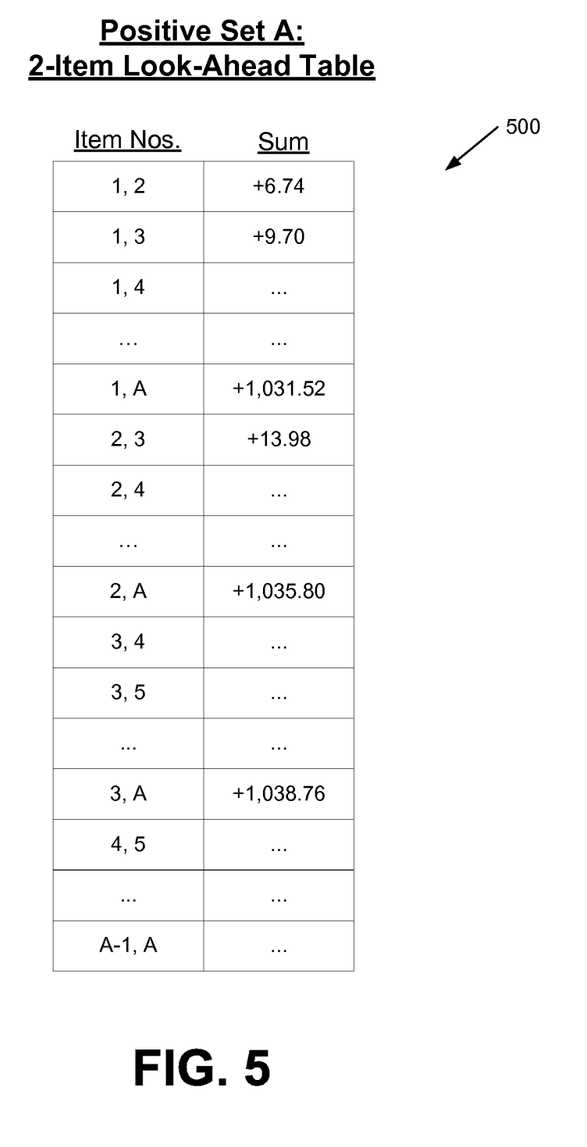
FIG. 5 illustrates an example two-item look-ahead table in accordance with one or more illustrative aspects described herein.

In step 203, one or more positive and/or negative look-ahead tables may be generated and stored, based on the positive input set A and the negative input set B. An example of a partial look-ahead table 500 is shown in FIG. 5. Table 500 is a two-item positive look-ahead table which has been generated based on the positive input set in array 300a. Positive look-ahead tables may be generated of any size (1 to A), and negative look-ahead tables may be generated of any size (1 to B), however, in some computing environments, look-ahead tables may generally be created for smaller combinations of numbers (e.g., 1-, 2-, 3-, 4-, or 5-item look-ahead tables), based on memory size considerations. A 2-item look-ahead table stores every possible 2-item combination and its sum for either the positive or negative input set. Similarly, a 3-item look-ahead table stores every possible 3-item combination and its sum for the positive or negative input set, and so on. Thus, for a positive input set size of A, a two-item look-ahead table would have [A!/((A-2)!2!)] rows, and 3-item look-ahead table would have [A!/((A-3)!3!)] rows, and so on. As described in more detail below, one or more look-ahead tables optionally generated and stored in step 203 may subsequently be used to find reconciliation matches at different subset size levels from a current subset size reconciliation attempt size.

In step 204, a processing loop begins in which a reconciliation attempt may be performed for a specific combination of a positive subset size X and a negative subset size Y. For example, if the reconciliation input set consists of 100 positive numbers and 100 negative numbers, than a single iteration of the processing loop 204-208 may be executed to look for a reconciliation solution having 99 positive numbers and 99 negative numbers. A second iteration of the processing loop 204-208 may be executed to look for a reconciliation solution having 99 positive numbers and 98 negative numbers, and a third iteration of the processing loop 204-208 may be executed to look for a reconciliation solution having 98 positive numbers and 99 negative numbers, and so on.

It may be advantageous in certain embodiments to find reconciliation solution sets using a maximum amount of the numbers from the reconciliation input set. That is, a successful reconciliation solution that uses 195 out of 200 input numbers may be preferable to a reconciliation solution that uses only 55 out of the 200 input numbers. In such embodiments, the processing loop 204-208 may be executed such that the reconciliation attempts having the most total numbers N (i.e., positive subset size X+negative subset size Y) are executed first. In some embodiments, a number of worker threads may be created and executed in parallel, wherein each worker thread is assigned to perform different iterations of processing loop 204-208. For instance, for the above example having A=100 positive numbers and B=100 negative input numbers, four worker threads may be initially (or dynamically) created to perform an initial four reconciliation attempts: X=100, Y=99 (N=199); X=99, Y=100 (N=199), X=99, Y=99 (N=198); and X=100, Y=98 (N=198). As soon as the first of these four threads finishes its execution of the processing loop 204-208, the thread may be re-tasked (or destroyed and a new thread created) to perform a next reconciliation attempt with a highest available N, in this case X=98, Y=100 (N=198). The next available thread may be assigned to perform a reconciliation attempt for one of the N=197 scenarios, and so on. Although the reconciliation process uses four worker threads in this example, it should be understood that any number of worker threads may be used in other implementations, depending on the computing environment 101.

In step 205, for a reconciliation attempt using X positive numbers and Y negative numbers, an initial calculation may be performed to determine an amount of overlap between the range of X-sized positive subset sums and Y-sized negative subset sums. As discussed above in step 202, sets of maxima and/or minima subset sum values may be generated and stored for each possible X positive subset size and each possible Y negative subset size. The maxima subset sums generated in step 202 include $X_{max}$ (i.e., Max X [1 to A]) and $X_{min}$ (i.e., Max X [1 to X]) corresponding to the largest and smallest possible values for sums of X-sized subsets in a reconciliation input set of A positive numbers. Similarly, $Y_{max}$ (Max Y [1 to B]) and $Y_{min}$ (Max Y [1 to Y]) may correspond to the largest and smallest possible values for sums of Y-sized subsets in a reconciliation input set of B negative numbers.

The ranges of possible positive subset sums [$X_{max}$ to $X_{min}$] and possible negative subset sums [$Y_{max}$ to $Y_{min}$] may be calculated and compared in step 205. Referring now to FIGS. 6A-6F, six comparisons are shown between positive subset sum ranges and negative subset sum ranges. As illustrated in these examples, in some cases (FIGS. 6A and 6B) there may be no overlap between the ranges of possible positive subset sums and possible negative subset sums. In such cases, there is no possible reconciliation solution for an X-sized positive subset and a Y-sized negative subset. Accordingly, this reconciliation attempt may be stopped and the worker thread or other process executing loop 204-208 may be re-tasked or destroyed.

In other examples, an overlapping portion may be identified between the positive and negative subset sum ranges. In some cases, the top portion of one subset sum range may overlap with the bottom portion of the other range (FIGS. 6C and 6D), and in other cases one of the subset sum ranges may completely envelop the other range (FIGS. 6E and 6F). In all of these cases, the reconciliation attempt may proceed to step 206. However, as described below, it may be possible to avoid generating and comparing subset sums for portions of the non-overlapping ranges shown in FIGS. 6C-6F.

In step 206, continuing the reconciliation attempt using X positive numbers and Y negative numbers, a plurality of X-sized positive subset sums may be generated and may be compared to a plurality of Y-sized negative subset sums. In some embodiments, the pluralities of subset summing operations for X-sized positive subsets and Y-sized negative subsets may be performed according to a predetermined bit shifting sequence. Referring again to FIG. 7, this example illustrates a series of summing operations to generate a plurality of subset sums for 3-item subsets in a positive set size of 6. In this example, the summing operations are performed in the order determined by the bit shifting sequence shown in FIG. 7. In this bit shifting sequence, the 3 most significant (i.e., rightmost) bits are initially selected ("1"), and the numbers corresponding to the selected bits (30, 40, and 45) are summed, equaling 115 ($X_{max}$). For the second summing operation, the least significant selected bit is shifted one position to the left, and the corresponding selected numbers (25, 40, and 45) are summed, equaling 110. The bit shifting sequence continues by shifting the least significant selected bit one position to the left for each summing operation, until the least significant selected bit reaches the first (i.e., leftmost) position in the array. At that point, the second least significant selected bit is shifted one position to the left, and the least significant selected bit is reset to a position just to the left of the shifted bit. When the two least significant selected bits are in the two leftmost positions in the array, then the third least significant bit is shifted one position to the left, and two least significant selected bits are reset to positions just to the left of the shifted bit, and so on. The bit shifting sequence ends with the selected bits occupy all of least significant (i.e., leftmost) positions in the array.

It should be understood that the bit-arrays in this example may be replaced by other data structures in other examples. For instance, the 6-bit arrays shown in FIG. 7 may be implemented as a single byte in which the first two bits are ignored. Other data structures may be used for other subset sizes X. For example, if X=99, four 32-bit INT data structures may be used to perform the bit shifting and summing operations. Additionally, in some embodiments, the pluralities of subset summing operations may be further optimized using the bit shifting sequence. For example, after the first subset (e.g., $X_{max}$) is summed, the subsequent subset sums may be calculated by subtracting the value of any deselected bit and adding the value of any newly selected bits. For example, if X=100, when using the bit shifting sequence described above, the first summing operation may require the processor 103 to perform 100 separate addition operations, however, the $2^{nd}$ through the $99^{th}$ summing operations may each require the processor 103 to perform only one subtraction and one addition operation to generate the new subset sum, and so on.

Each of the X-sized positive subset sums generated in step 206 may be compared to one or more Y-sized negative subset sums. If any of these sums are equal, a reconciliation solution has been found (207: Yes), and the worker thread or other process executing loop 204-208 may stop and return the X-sized subset of positive numbers and the Y-sized subset of negative numbers as a first reconciliation solution. In some embodiments, after a first reconciliation solution is identified by any of the worker threads, the other worker threads may be stopped and the first reconciliation solution may be returned as an optimal solution. In other embodiments, one or more of the other worker threads may be allowed to continue so that one or more additional reconciliation solutions may be found. For example, if a first worker thread performing a reconciliation attempt at X=98, Y=100 (N=198) finds a reconciliation solution, then another worker thread performing a (N=197) reconciliation attempt may be stopped. However, a third worker thread performing a (N=199) reconciliation attempt may be allowed to continue so that an N=199 reconciliation solution potentially may be found.

In certain embodiments, one or more portions of the X-sized positive subset sum sequence, and/or one or more portions of the Y-sized negative subset sum sequence, might not need to be generated or compared in step 206. As illustrated above in FIGS. 6C-6F, some portions of a positive subset sum ranges might not overlap with any portion of a corresponding negative subset sum range, or vice versa. These non-overlapping portions within the positive subset sum range and/or negative subset sum range may be identified by comparing the positive and negative local maxima and/or local minima values calculated and stored in step 202.

An example of identifying a non-overlapping portion between a positive subset sum range and a negative subset sum range may be described with reference to FIG. 7. In this example, as the series of subset sums are calculated from the top-down according to the predetermined bit shifting sequence, a number of local maxima are found. The first local maximum encountered in this example is Max X [1 to A-1], having a sum of 95, and the second local maximum encountered will be Max X [1 to A-1], having a sum of 70. Based on the bit shifting sequence used in this example, each local maximum corresponds to a point in the series of subset sums at which no subsequent subset sum in the series will exceed the local maximum. That is, after the local maximum of 95 is found at Max X [1 to A-1], the reconciliation process may conclude that none of the remaining uncalculated subset sums below Max X [1 to A-1] will exceed 95. Therefore, at this point, the Max X [1 to A-1] value may be compared to the $Y_{min}$ value. If the Max X [1 to A-1] value (i.e., 95) is smaller than the $Y_{min}$ value (e.g., 98), then none of the remaining X-sized subset sums below Max X [1 to A-1] need to be calculated. Similarly, if the Max X [1 to A-1] value (i.e., 95) is greater than the $Y_{min}$ value (e.g., 92), but the Max X [1 to A-2] value (i.e., 70) is less than the $Y_{min}$ value (e.g., 92), then none of the remaining X-sized subset sums below Max X [1 to A-2] need to be calculated. That is, as soon as an X local maximum falls below the $Y_{min}$ value when executing the bit shifting and subset summing sequence described above, then all of the remaining uncalculated X subset sums in the sequence must be within a lower non-overlapping portion of the positive subset sum range. In this case, because there is no possible reconciliation solution for any subsequent X-sized positive subset with any Y-sized negative subset, this reconciliation attempt may be stopped and the worker thread or other process executing loop 204-208 may be re-tasked or destroyed.

Figure 6A:
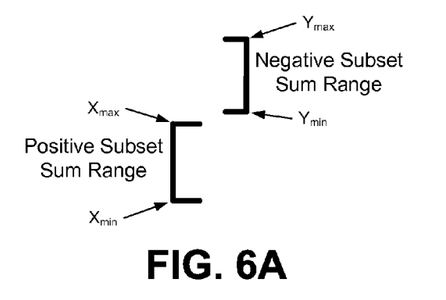
FIG. 6A-6F illustrate six overlapping examples between a positive subset sum range and a negative subset sum range in accordance with one or more illustrative aspects described herein.
Figure 6B:
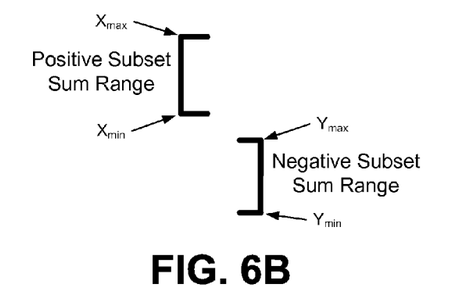
Figure 6C:
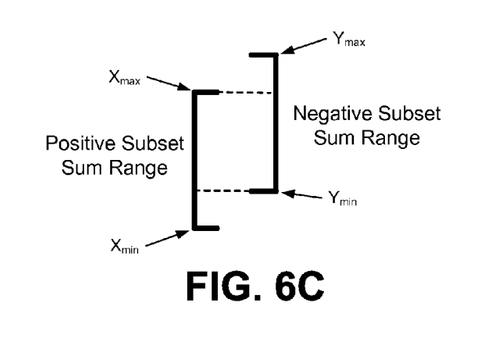
Figure 6D:
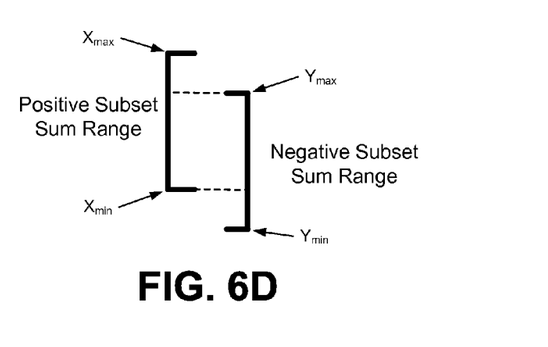
Figure 6E:
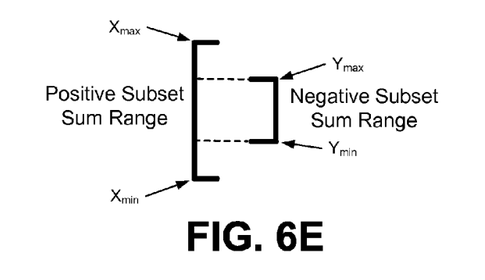
Figure 6F:
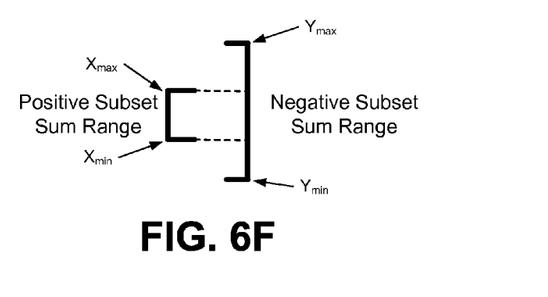

The previous example related to identifying a non-overlapping lower portion of a positive subset sum range, for example, the bottom portion of the positive subset sum range in FIGS. 6C and 6E. However, similar techniques may be used to identify any of the non-overlapping upper and lower portions in positive and negative subset sum ranges in FIGS. 6C-6F. For example, when executing a bit shifting and subset summing sequence for a negative subset size Y, non-overlapping portions at the bottom of the negative subset sum range may be found by comparing each local maxima (e.g., Max Y [1 to B-1], Max Y [1 to B-2], etc.) to the $X_{min}$ value. As soon as a Y local maximum falls below the $X_{min}$ value, then all of the remaining uncalculated Y subset sums in the sequence must be within a lower non-overlapping portion of the negative subset sum range (e.g., the bottom portions of the negative subset sum ranges in FIGS. 6D and 6F).

Additionally, in some embodiments, an alternative bit shifting sequence for generating and comparing subset sums may be performed instead of (or in addition) to the bit shifting sequence illustrated in FIG. 7. For example, in certain embodiments, the bits may be shifted from least significant to most significant, in the opposite (i.e., bottom-up) manner to the example shown in FIG. 7. In such examples, the local minima may be identified in step 202 based on the bottom-up bit shifting sequence, using similar techniques to the determination of the local maxima in FIG. 7. The local minima in a bottom-up bit shifting sequence may correspond to the points in the series of subset sums at which no subsequent subset sum in the series will be greater than the local minimum. In these cases, when executing a bottom-up bit shifting and subset summing sequence for a positive subset size X, non-overlapping portions at the top of the positive subset sum range may be found by comparing each local minima (e.g., Min X [1 to X+1], Min X [1 to X+2], . . . , Min X [1 to A]) to the $Y_{max}$ value. As soon as an X local minimum exceeds the $Y_{max}$ value, then all of the remaining uncalculated X sum subsets in the bottom-up sequence must be within an upper non-overlapping portion of the positive subset sum range (e.g., the upper portions of the positive subset sum ranges in FIGS. 6D and 6E). Similarly, when executing a bottom-up bit shifting and subset summing sequence for a negative subset size Y, non-overlapping portions at the top of the negative subset sum range may be found by comparing each local minima (e.g., Min Y [1 to Y+1], Min Y [1 to Y+2], . . . , Min Y [1 to B]) to the $X_{max}$ value. As soon as a Y local minimum exceeds the $X_{max}$ value, then all of the remaining uncalculated Y sum subsets in the bottom-up sequence must be within an upper non-overlapping portion of the negative subset sum range (e.g., the upper portions of the negative subset sum ranges in FIGS. 6C and 6F). In these examples, similar to the previous examples, these reconciliation attempts may be stopped and the worker thread or other process executing loop 204-208 may be re-tasked or destroyed.

As discussed above, one or more look-ahead tables may be generated and stored in step 203, for example, a 2-item or 3-item look-ahead table storing every possible 2-item or 3-item combination and their sums, for the positive input set A and/or the negative input set B. In certain embodiments, the one or more look-ahead tables may be used to find a reconciliation solution, even if a solution is not found during the sequence of generating and comparing positive and negative subset sums in step 206. For example, if an X-sized positive subset sum is not found that equals a Y-sized negative subset sum in step 206, and thus no reconciliation solution is found for this reconciliation attempt (207: No), then the reconciliation process may attempt to find a solution using look-ahead tables in step 208.

In some embodiments, an attempt to find a look-ahead solution in step 208 may be performed after a comparison of an X-size positive subset sum to a Y-size negative subset sum in step 206. If a first positive subset sum and a second negative subset sum are not equal (207: No), then the difference between subset sums is compared to the sum values in one or more look-ahead tables in step 208. For example, if the first positive subset sum is greater than the second negative subset sum by a difference D, then the reconciliation process in step 208 may look for a sum value D in a positive look-ahead table. Similarly, if first positive subset sum is less than the second negative subset by the difference D, then the reconciliation process may look for a sum value D in a negative look-ahead table. If the sum value D is found in a look-ahead table, this indicates that corresponding items in the look-ahead table may be removed from the combination of positive and negative subset items to form a reconciled (zero-sum) subset of items. For example, referring to the sample look-ahead table 500 in FIG. 5, which is based on the positive input set A in FIG. 3, if a first positive subset sum is added to a second negative subset sum in step 206 and the difference is +9.70, then searching the sum column in the positive look-ahead table 500 indicates that if items 1 and 3 from the positive array 300a are removed from first positive subset, then the updated first positive subset and the second negative subset may form a reconciliation solution. However, before concluding that a look-ahead reconciliation solution has been found in this example, the first positive subset may be checked to determine that it contains items 1 and 3 from the positive input set 300a. That is, if the items 1 and 3 are not included in the first positive subset, then they cannot be removed and a look-ahead reconciliation solution has not been found.

As illustrated in this example, attempts to find a look-ahead reconciliation solution in step 208 may be performed immediately after each comparison in step 206 between a positive subset sum and a negative subset sum, for X-sized positive subsets and Y-sized negative subsets. In certain embodiments, whenever a first reconciliation solution is found for an X-sized positive subset and a Y-sized negative subset, in either step 206 or 208, then the reconciliation process may be stopped and the first reconciliation solution may be returned as an optimal solution. In other embodiments, a current worker thread or process, and one or more of the other worker threads or processes, may be allowed to continue so that one or more additional reconciliation solutions may be found. As noted above, it may be advantageous in certain embodiments to find reconciliation solution sets using a maximum amount of numbers from the reconciliation input set. Therefore, if a first reconciliation solution is a look-ahead solution found by a worker thread in step 208, then that worker thread may be allowed to continue to attempt to find another reconciliation solution in step 206 using more total input numbers. For example, if the first worker thread is performing a reconciliation attempt at X=98, Y=100 (N=198), and finds a look-ahead solution using a 3-item look-ahead table, then the look-ahead reconciliation would use (N=195) total items from the input set. Therefore, in this example, the reconciliation process may allow the current worker thread and one or more other worker threads, to continue performing reconciliation attempts at (N>195). Additionally, in this example, the reconciliation process may allow the current worker thread to continue searching for reconciliation attempts in step 206, but may stop subsequent look-ahead reconciliation attempts in step 208.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. One or more non-transitory computer-readable media, storing computer-executable instructions that, when executed by a processor, cause a computing device to:
    receive an input set of N numbers corresponding to a plurality of N financial transactions, the input set of N numbers comprising a set of A positive numbers and a set of B negative numbers;
    determine a positive subset size X and a negative subset size Y for a first reconciliation attempt, wherein the positive subset size X is less than the number of positive numbers A in the input set, and the negative subset size Y is less than the number of negative numbers B in the input set; and
    perform the first reconciliation attempt, the first reconciliation attempt comprising:
        determining a positive subset sum range by calculating a maximum positive subset sum $X_{max}$ and a minimum positive subset sum $X_{min}$;
        determining a negative subset sum range by calculating a maximum negative subset sum $Y_{max}$ and a minimum negative subset sum $Y_{min}$;
        identifying one or more overlapping portions between the positive subset sum range and the negative subset sum range;
        identifying at least one non-overlapping portion between the positive subset sum range and the negative subset sum range; and
        for the one or more overlapping portions between the positive subset sum range and the negative subset sum range, performing a plurality of subset sum comparisons, wherein in each subset sum comparison a sum of X numbers selected from the set of A positive numbers is compared to a sum of Y numbers selected from the set of B negative numbers,
        wherein for the at least one non-overlapping portion between the positive subset sum range and the negative subset sum range, a corresponding plurality of subset sum comparisons are not performed.

2. The computer-readable media of claim 1, wherein performing the plurality of subset sum comparisons for the one or more overlapping portions between the positive subset sum range and the negative subset sum range comprises:
    performing a first comparison between a first sum of X numbers selected from the set of A positive numbers and a second sum of Y numbers selected from the set of B negative numbers;
    determining based on the first comparison that the first sum of X numbers equals the second sum of Y numbers; and
    based on the first comparison, stopping the first reconciliation attempt and returning the X selected numbers from the set of A positive numbers and the Y selected numbers from the set of B negative numbers as a first reconciliation solution.

3. The computer-readable media of claim 1, storing further computer-executable instructions that, when executed by the processor, cause the computing device to:
    generate and store at least one look-ahead table based on the input set of N numbers;
    wherein performing the plurality of subset sum comparisons for the one or more overlapping portions between the positive subset sum range and the negative subset sum range comprises:
        performing a first comparison between a first sum of X numbers selected from the set of A positive numbers and a second sum of Y numbers selected from the set of B negative numbers;
        determining that the first sum of X numbers does not equal the second sum of Y numbers by a first difference amount;
        performing a second comparison between the first difference amount and one or more values in the at least one look-ahead table;
        determining based on the second comparison that the first difference amount equals a first value in the at least one look-ahead table; and
        based on the second comparison, stopping the first reconciliation attempt and returning first reconciliation solution set comprising the X selected numbers from the set of A positive numbers, the Y selected numbers from the set of B negative numbers, minus an additional set of numbers from the at least one look-ahead table which correspond to the first value in the at least one look-ahead table.

4. The computer-readable media of claim 3, wherein the at least one look-ahead table comprises one or more of:

a 1-, 2-, or 3-item positive look-ahead table comprising all possible sums of 1, 2, or 3 numbers from the set of A positive numbers; and a 1-, 2-, or 3-item negative look-ahead table comprising all possible sums of 1, 2, or 3 numbers from the set of B negative numbers.

5. The computer-readable media of claim 1, wherein identifying the at least one non-overlapping portion between the positive subset sum range and the negative subset sum range, comprises:

performing a series of summing operations according to a predetermined bit shifting sequence, and generating a series of subset sums, wherein each said summing operating corresponds to a different subset of X numbers within the set of A positive numbers;

identifying and storing at least one of a local maxima and a local minima in the plurality of subset sums;

performing a first comparison between the at least one local maxima or local minima in the series of subset sums, and at least one of the minimum negative subset sum $Y_{min}$ or the maximum negative subset sum $Y_{max}$; and based on the first comparison, determining that a portion of the positive subset sum range, starting at the at least one local maxima or local minima in the sequence of subset sums, cannot be reconciled with any portion of the negative subset sum range.

6. The computer-readable media of claim 5, wherein performing the first comparison comprises:

determining that a first local maxima in the sequence of subset sums is less than the minimum negative subset sum $Y_{min}$;

and wherein based on the first comparison, determining that a first portion of the positive subset sum range between the first local maxima and the minimum positive subset sum $X_{min}$ cannot be reconciled with any portion of the negative subset sum range.

7. The computer-readable media of claim 1, storing further computer-executable instructions that, when executed by the processor, cause the computing device to:

determine a positive subset size X' and a negative subset size Y' for a second reconciliation attempt, wherein the positive subset size X' is less than the number of positive numbers A in the input set, and the negative subset size Y' is less than the number of negative numbers B in the input set;

perform the second reconciliation attempt, the second reconciliation attempt comprising:

determining a second positive subset sum range by calculating a maximum positive subset sum $X'_{max}$ and a minimum positive subset sum $X'_{min}$;

determining a second negative subset sum range by calculating a maximum negative subset sum $Y'_{max}$ and a minimum negative subset sum $Y'_{min}$;

determining that the second positive subset sum range does not overlap with the second negative subset sum range; and stopping the second reconciliation attempt based on the determination that the second positive subset sum range does not overlap with the second negative subset sum range.

8. The computer-readable media of claim 7, storing further computer-executable instructions that, when executed by the processor, cause the computing device to:

create a first worker thread to perform the first reconciliation attempt; and create a second worker thread to perform the second reconciliation attempt, wherein the first worker thread and the second worker thread execute in parallel.

9. The computer-readable media of claim 1, storing further computer-executable instructions that, when executed by the processor, cause the computing device to:

create a new worker thread at the completion of the first reconciliation attempt;

assign the new worker thread to perform a second reconciliation attempt for a positive subset size X' and a negative subset size Y', wherein the sum of X' and Y' is a largest possible sum of a positive subset size and a negative subset size for which a worker thread has not yet been assigned to perform a reconciliation attempt.

10. An apparatus, comprising:

at least one processor; and memory storing computer-readable instructions that, when executed by the at least one processor, cause the apparatus to:

receive an input set of N numbers corresponding to a plurality of N financial transactions, the input set of N numbers comprising a set of A positive numbers and a set of B negative numbers;

determine a positive subset size X and a negative subset size Y for a first reconciliation attempt, wherein the positive subset size X is less than the number of positive numbers A in the input set, and the negative subset size Y is less than the number of negative numbers B in the input set; and perform the first reconciliation attempt, the first reconciliation attempt comprising:

determining a positive subset sum range by calculating a maximum positive subset sum $X_{max}$ and a minimum positive subset sum $X_{min}$;

determining a negative subset sum range by calculating a maximum negative subset sum $Y_{max}$ and a minimum negative subset sum $Y_{min}$;

identifying one or more overlapping portions between the positive subset sum range and the negative subset sum range;

identifying at least one non-overlapping portion between the positive subset sum range and the negative subset sum range; and for the one or more overlapping portions between the positive subset sum range and the negative subset sum range, performing a plurality of subset sum comparisons, wherein in each subset sum comparison a sum of X numbers selected from the set of A positive numbers is compared to a sum of Y numbers selected from the set of B negative numbers, wherein for the at least one non-overlapping portion between the positive subset sum range and the negative subset sum range, a corresponding plurality of subset sum comparisons are not performed.

11. The apparatus of claim 10, wherein performing the plurality of subset sum comparisons for the one or more overlapping portions between the positive subset sum range and the negative subset sum range comprises:

performing a first comparison between a first sum of X numbers selected from the set of A positive numbers and a second sum of Y numbers selected from the set of B negative numbers;

determining based on the first comparison that the first sum of X numbers equals the second sum of Y numbers; and based on the first comparison, stopping the first reconciliation attempt and returning the X selected numbers from the set of A positive numbers and the Y selected numbers from the set of B negative numbers as a first reconciliation solution.

12. The apparatus of claim 10, the memory storing further computer-readable instructions that, when executed by the at least one processor, cause the apparatus to:
generate and store at least one look-ahead table based on the input set of N numbers;
wherein performing the plurality of subset sum comparisons for the one or more overlapping portions between the positive subset sum range and the negative subset sum range comprises:
performing a first comparison between a first sum of X numbers selected from the set of A positive numbers and a second sum of Y numbers selected from the set of B negative numbers;
determining that the first sum of X numbers does not equal the second sum of Y numbers by a first difference amount;
performing a second comparison between the first difference amount and one or more values in the at least one look-ahead table;
determining based on the second comparison that the first difference amount equals a first value in the at least one look-ahead table; and
based on the second comparison, stopping the first reconciliation attempt and returning first reconciliation solution set comprising the X selected numbers from the set of A positive numbers, the Y selected numbers from the set of B negative numbers, minus an additional set of numbers from the at least one look-ahead table which correspond to the first value in the at least one look-ahead table.

13. The apparatus of claim 10, wherein identifying the at least one non-overlapping portion between the positive subset sum range and the negative subset sum range, comprises:
performing a series of summing operations according to a predetermined bit shifting sequence, and generating a series of subset sums, wherein each said summing operating corresponds to a different subset of X numbers within the set of A positive numbers;
identifying and storing at least one of a local maxima and a local minima in the plurality of subset sums;
performing a first comparison between the at least one local maxima or local minima in the series of subset sums, and at least one of the minimum negative subset sum $Y_{min}$ or the maximum negative subset sum $Y_{max}$; and
based on the first comparison, determining that a portion of the positive subset sum range, starting at the at least one local maxima or local minima in the sequence of subset sums, cannot be reconciled with any portion of the negative subset sum range.

14. The apparatus of claim 13, wherein performing the first comparison comprises:
determining that a first local maxima in the sequence of subset sums is less than the minimum negative subset sum $Y_{min}$;
and wherein based on the first comparison, determining that a first portion of the positive subset sum range between the first local maxima and the minimum positive subset sum $X_{min}$ cannot be reconciled with any portion of the negative subset sum range.

15. The apparatus of claim 10, the memory storing further computer-readable instructions that, when executed by the at least one processor, cause the apparatus to:

determine a positive subset size X' and a negative subset size Y' for a second reconciliation attempt, wherein the positive subset size X' is less than the number of positive numbers A in the input set, and the negative subset size Y' is less than the number of negative numbers B in the input set;
perform the second reconciliation attempt, the second reconciliation attempt comprising:
determining a second positive subset sum range by calculating a maximum positive subset sum $X'_{max}$ and a minimum positive subset sum $X'_{min}$;
determining a second negative subset sum range by calculating a maximum negative subset sum $Y'_{max}$ and a minimum negative subset sum $Y'_{min}$;
determining that the second positive subset sum range does not overlap with the second negative subset sum range; and
stopping the second reconciliation attempt based on the determination that the second positive subset sum range does not overlap with the second negative subset sum range.

16. A method, comprising:
receiving an input set of N numbers corresponding to a plurality of N financial transactions, the input set of N numbers comprising a set of A positive numbers and a set of B negative numbers;
determining a positive subset size X and a negative subset size Y for a first reconciliation attempt, wherein the positive subset size X is less than the number of positive numbers A in the input set, and the negative subset size Y is less than the number of negative numbers B in the input set; and
performing the first reconciliation attempt, the first reconciliation attempt comprising:
determining a positive subset sum range by calculating a maximum positive subset sum $X_{max}$ and a minimum positive subset sum $X_{min}$;
determining a negative subset sum range by calculating a maximum negative subset sum $Y_{max}$ and a minimum negative subset sum $Y_{min}$;
identifying one or more overlapping portions between the positive subset sum range and the negative subset sum range;
identifying at least one non-overlapping portion between the positive subset sum range and the negative subset sum range; and
for the one or more overlapping portions between the positive subset sum range and the negative subset sum range, performing a plurality of subset sum comparisons, wherein in each subset sum comparison a sum of X numbers selected from the set of A positive numbers is compared to a sum of Y numbers selected from the set of B negative numbers,
wherein for the at least one non-overlapping portion between the positive subset sum range and the negative subset sum range, a corresponding plurality of subset sum comparisons are not performed.

17. The method of claim 16, wherein performing the plurality of subset sum comparisons for the one or more overlapping portions between the positive subset sum range and the negative subset sum range comprises:
performing a first comparison between a first sum of X numbers selected from the set of A positive numbers and a second sum of Y numbers selected from the set of B negative numbers;
determining based on the first comparison that the first sum of X numbers equals the second sum of Y numbers; and based on the first comparison, stopping the first reconciliation attempt and returning the X selected numbers from the set of A positive numbers and the Y selected numbers from the set of B negative numbers as a first reconciliation solution.

18. The method of claim 16, further comprising:

generating and storing at least one look-ahead table based on the input set of N numbers;

wherein performing the plurality of subset sum comparisons for the one or more overlapping portions between the positive subset sum range and the negative subset sum range comprises:

performing a first comparison between a first sum of X numbers selected from the set of A positive numbers and a second sum of Y numbers selected from the set of B negative numbers;

determining that the first sum of X numbers does not equal the second sum of Y numbers by a first difference amount;

performing a second comparison between the first difference amount and one or more values in the at least one look-ahead table;

determining based on the second comparison that the first difference amount equals a first value in the at least one look-ahead table; and based on the second comparison, stopping the first reconciliation attempt and returning first reconciliation solution set comprising the X selected numbers from the set of A positive numbers, the Y selected numbers from the set of B negative numbers, minus an additional set of numbers from the at least one look-ahead table which correspond to the first value in the at least one look-ahead table.

19. The method of claim 16, wherein identifying the at least one non-overlapping portion between the positive subset sum range and the negative subset sum range, comprises:

performing a series of summing operations according to a predetermined bit shifting sequence, and generating a series of subset sums, wherein each said summing operating corresponds to a different subset of X numbers within the set of A positive numbers;

identifying and storing at least one of a local maxima and a local minima in the plurality of subset sums;

performing a first comparison between the at least one local maxima or local minima in the series of subset sums, and at least one of the minimum negative subset sum $Y_{min}$ or the maximum negative subset sum $Y_{max}$; and based on the first comparison, determining that a portion of the positive subset sum range, starting at the at least one local maxima or local minima in the sequence of subset sums, cannot be reconciled with any portion of the negative subset sum range.

20. The method claim 19, wherein performing the first comparison comprises: determining that a first local maxima in the sequence of subset sums is less than the minimum negative subset sum $Y_{min}$, and wherein based on the first comparison, determining that a first portion of the positive subset sum range between the first local maxima and the minimum positive subset sum $X_{min}$ cannot be reconciled with any portion of the negative subset sum range.

* * * * *